111 United States Patent [19]
Antonini et al.

[11] 4,322,850
[45] Mar. 30, 1982

[54] SAMPLING SYSTEM FOR DECODING BIPHASE-CODED DATA MESSAGES

[75] Inventors: Atus Antonini, Milan; Ugo W. Rossi, Ravenna, both of Italy

[73] Assignee: Societa Italiana Telecomunicazioni Siemens S.p.A., Milan, Italy

[21] Appl. No.: 140,798

[22] Filed: Apr. 16, 1980

Related U.S. Application Data

[63] Continuation-in-part of Ser. No. 76,564, Sep. 18, 1979, abandoned.

[30] Foreign Application Priority Data

Sep. 19, 1978 [IT]   Italy .................. 27826 A/78

[51] Int. Cl.³ .............................. H03D 3/22
[52] U.S. Cl. ........................ 375/81; 375/82; 375/87; 329/50
[58] Field of Search ............ 328/73, 74, 133, 155; 329/50, 122, 124; 331/1 A; 360/44, 51, 42, 40; 375/81, 82, 104, 120, 83, 87; 455/218

[56] References Cited

U.S. PATENT DOCUMENTS 3,806,918  4/1974  Cauthron et al. ............... 375/81
3,944,940  3/1976  Desai ........................... 375/81
4,112,383  9/1978  Burget .......................... 329/50
4,195,264  3/1980  Marchetti ...................... 329/122

Primary Examiner—Benedict V. Safourek
Attorney, Agent, or Firm—Karl F. Ross

[57] ABSTRACT

A receiving station of a data-transmission system decodes an incoming pulse train in the shape of a differentially biphase-coded carrier wave whose cycles represent rspective message bits; the wave undergoes a phase reversal at the beginning of every cycle in which the transmitted binary signal has the logical value "1" but does not change in phase when that value is "0". The received pulse train is differentiated to yield either one or two spikes during each cycle, one such spike invariably occurring in the middle of a cycle. Since only these periodically recurring spikes determine the instants at which the carrier wave must be sampled during decoding, a gate in the differentiator output is blocked during part of each cycle by a locally generated square wave which also controls the sampling. A phase detector comprises a flip-flop, settable by the complement of the local square wave and resettable by the unsuppressed spikes, whose set output works into an AND gate also receiving the local square wave and a quadrature replica thereof overlapping same for a quarter-cycle whereby that gate conducts if the period of overlap coincides with the setting of the flip-flop, i.e. when blocking takes place at the wrong time. Resulting coincidence pulses are integrated and, when recurring sufficiently often and fast, give rise to an error pulse shifting the local square wave by half a cycle.

3 Claims, 4 Drawing Figures

SAMPLING SYSTEM FOR DECODING BIPHASE-CODED DATA MESSAGES

CROSS-REFERENCE TO RELATED APPLICATION

This is a continuation-in-part of my copending application Ser. No. 076,564 filed Sept. 18, 1979 and now abandoned.

FIELD OF THE INVENTION

My present invention relates to a system for decoding, at a receiving station, an incoming pulse train in the shape of a biphase-coded carrier wave whose cycles represent respective bits of a binary message transmitted in base band.

BACKGROUND OF THE INVENTION

A particular carrier wave of the differentially biphase-coded type, conforming to one of the well-known split-phase codes, is characterized in that its phase is reversed at the beginning of every cycle in which the transmitted message signal has the logical value "1" whereas the phase remains unchanged when that logical value is "0". With a slightly different split-phase code, described in commonly owned U.S. patent application Ser. No. 970,147 filed Dec. 18, 1978 by Ezio Cottatellucci, now U.S. Pat. No. 4,232,387 such a 180° phase shift occurs only upon a change of the basic signal from "0" to "1" or vice versa.

The decoding of such a biphase-coded carrier wave can be performed, for example, by algebraically combining the squared or clipped wave with a replica thereof shifted by half a cycle to produce a ternary wave and sampling the latter midway in every other half-cycle of the original wave. The sampling operation can be timed with the aid of correlation pulses or spikes derived by differentiation from the incoming carrier wave, these spikes occurring invariably in the middle of each cycle while also appearing at irregular intervals—depending upon the logical values of the message bits—at the beginning of a new cycle. The correct sampling times can be determined from the recurrent pattern of the spikes.

As pointed out in another commonly owned U.S. patent application, Ser. No. 061,480 filed July 27, 1979 by Riccardo Caldarella et al, now U.S. Pat. No. 4,281,292, an alternate decoding technique yields correct results with sampling in either the first or the second half of a carrier-wave cycle, except for the fact that distortion experienced by the wave during transmission may make sampling in one half-cycle less error-prone in the presence of phase jitter and therefore more desirable than in the other half-cycle. Thus, it is generally necessary to distinguish between "right" and "wrong" half-cycles for sampling purposes, i.e. to select one of two possible trains of sampling pulses which can be derived from the incoming carrier wave by differentiation.

The solutions to these problems described in the above-identified commonly owned applications, whose disclosures are hereby incorporated by reference into the present application, call for the use of phase detectors designed to shift the sampling pulses by half their recurrence period upon detecting their alignment with the "wrong" half-cycles.

OBJECT OF THE INVENTION

The object of my present invention is to provide alternate means, generally applicable to a variety of differentially biphase-coded carrier waves, for establishing proper or preferred sampling times.

SUMMARY OF THE INVENTION

In accordance with my present invention, circuitry for producing a sequence of timing pulses to control a decoder in a receiver for biphase-coded carrier waves comprises differentiation means connected to the decoder input for deriving a spike from an incoming carrier wave upon each phase reversal thereof, timing means controlled by the differentiation means for producing a local square wave of the same frequency as the carrier wave but in substantial quadrature therewith, gating means with inputs respectively connected to the differentiation means and the timing means for blocking the transmission of spikes during a fraction of each cycle equal to substantially half a cycle, and phase-detection means with input connections to the gating means and to the timing means for emitting an error pulse in response to a discontinuity in the succession of spikes passed by the gating means, all as broadly disclosed in application Ser. No. 061,480. Whereas, however, that disclosure employs three cascaded data-type flip-flops as the phase-detecting means, I provide instead a single flip-flop of the set/reset type which is settable by the complement of the local square wave and resettable by the unblocked spikes traversing the gating means so as to remain in its reset state during one quarter of each cycle of that square wave as long as these unblocked spikes recur periodically. An output of the flip-flop is connected to a coincidence (AND or NOR) gate also receiving, from a pair of output leads of the timing means, the local square wave and a replica thereof, relatively offset by 90°, whose period of overlap normally coincides with the reset period of the flip-flop so as to cause this gate to conduct only in the event of noncoincidence of the two periods. An output circuit of the coincidence gate extends to the timing means for triggering same in that event to reverse the phase of the square wave.

BRIEF DESCRIPTION OF THE DRAWING

The above and other features of my invention will now be described in detail with reference to the accompanying drawing in which.

SPECIFIC DESCRIPTION

Figure 1:
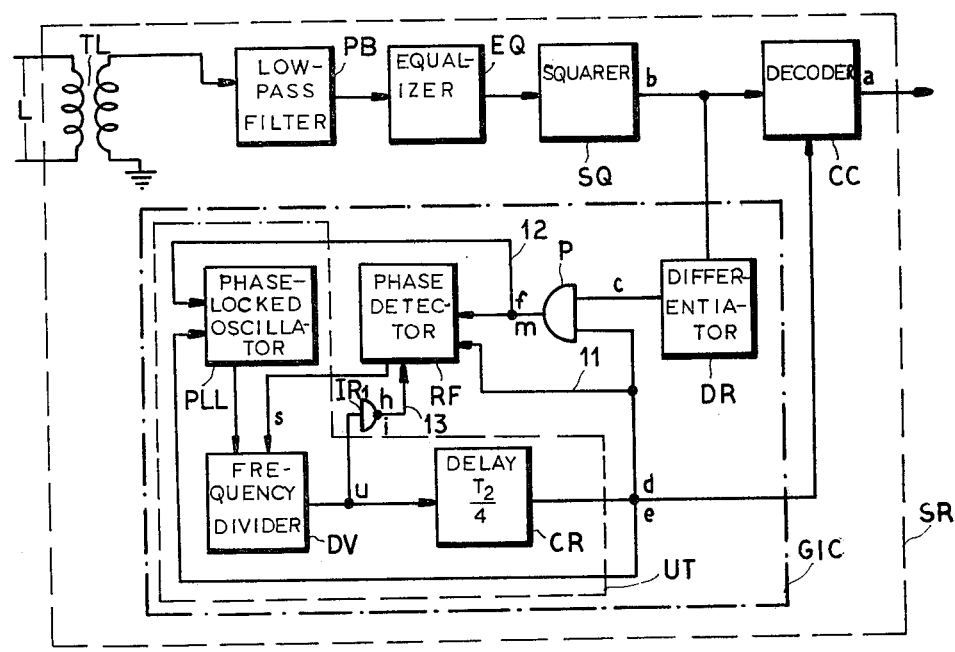
FIG. 1 is a block diagram of a receiver for biphase-coded carrier waves which includes sampling-controlling circuitry according to my invention.

The receiving station SR shown in FIG. 1 comprises a transformer TL with a primary winding connected across a transmission line L. A differentially biphase-coded carrier wave arriving over this line from a remote station is fed via a low-pass filter PB and an equalizer EQ to a squarer SQ which clips the incoming wave to convert it into a train b of rectangular pulses. The clipped carrier wave b is delivered to a decoder CC, designed to recover a binary base-band message a therefrom, and in parallel therewith to a differentiator DR which derives a series of spikes c from wave b and forms part of a sampling-pulse generator GIC. The latter further includes an AND gate P with an input connected to differentiator DR and with output connections to a phase detector RF and, in parallel therewith, to a synchronizing input of a local oscillator PLL provided with a phase-locking loop; the oscillator, operating at n times the carrier-wave frequency (n being an integer preferably equal to a power of 2), works into a frequency divider DV of step-down ratio 1:n whose output circuit contains a delay line CR. Oscillator PLL, frequency divider DV and delay line CR together constitute a timing unit UT whose output is a square wave d or e fed on the one hand to a control input of decoder CC and on the other hand to the second input of AND gate P. The output signal u of divider DV is also fed back to phase detector RF, as a square wave h or i, via an inverter $IR_1$.

Figure 3:
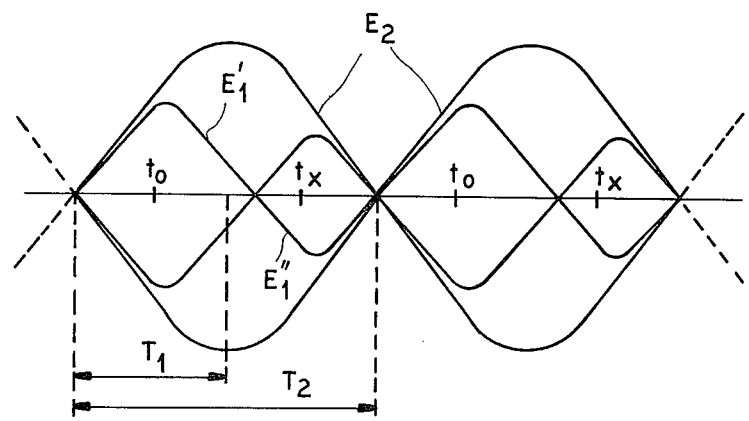
FIG. 3 shows an eye diagram of an incoming carrier wave to be decoded.
Figure 4:
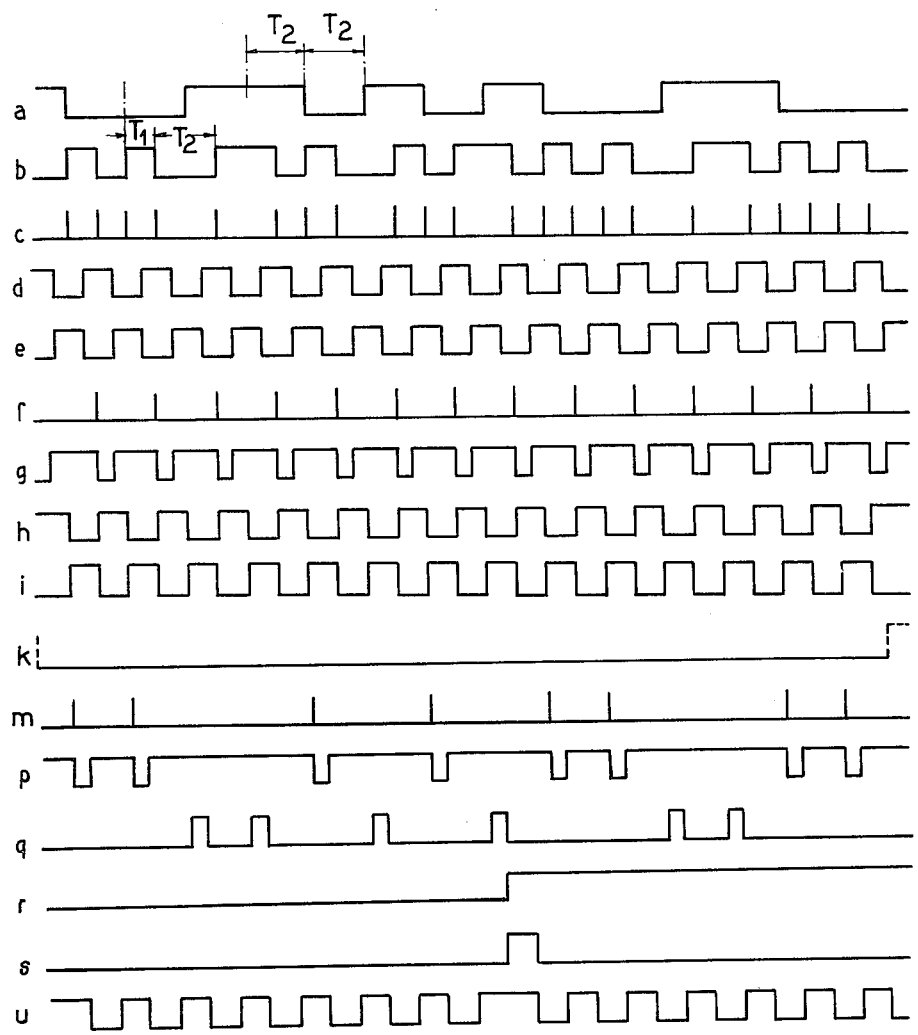
FIG. 4 is a set of graphs relating to the operation of the receiver shown in FIGS. 1 and 2.

Message signal a, carrier wave b, spikes c and square waves d, e have been illustrated in the first five graphs of FIG. 4. In that Figure I have indicated the pulse period $T_2$ of the message signal and the duration $T_1=T_2/2$ of a half-cycle of wave b. From graph b it will be noted that the carrier wave reverses its phase at the beginning of any cycle in which signal a is high, i.e. has the logical value "1;" this phase reversal keeps the clipped wave b at the voltage level last attained, the two levels being here considered positive and negative though one of them could be zero. Thus, in effect, the length of a pulse of wave b immediately preceding a cycle constituting a bit "1" is doubled whereby a subharmonic of frequency $F_2=1/2T_2$ is effectively superimposed upon the fundamental wave frequency $F_1=1/2T_1=1/T_2$. This has been schematically illustrated in FIG. 3 which represents an eye diagram of the incoming wave as viewed on an oscilloscope connected to the receiver input upstream of squarer SQ. It will be noted that larger eyes $E_2$ of length $T_2$, representing the subharmonic $F_2$, encompass pairs of smaller eyes $E_1'$, $E_1''$ whose length more or less equals $T_1$, representing the fundamental $F_1$.

The eyes $E_1'$, $E_1''$ shown in FIG. 3 are often found to be of unequal lengths owing to distortion along line L, which tends to attenuate higher frequencies more than lower ones, such distortion being usually compensated only imperfectly by the equalizer EQ of opposite attenuation characteristic, especially when the latter is of the nonadaptive type. The relative eye size, therefore, may differ according to whether the wave is monitored upstream or downstream of the equalizer. If the decoder is so designed that correct samples could be obtained at the center of either half-cycle of frequency $F_1$, and if the eye of a particular half-cycle (e.g. the first one as in the illustrated example) is invariably larger than that of the other half-cycle on account of distortion phenomena, a system according to my invention can also be used for insuring that sampling always takes place in the half-cycle with the larger eye in order to reduce the error rate.

In the following description it will be assumed that, for one of the reasons discussed above, the decoder CC of FIG. 1 is to sample the suitably pretreated carrier wave b at instants $t_0$, substantially midway of the first half of each cycle of length $T_2$, rather than at correspondingly positioned instants $t_x$ in the second half.

Graph f, FIG. 4, shows a succession of spikes corresponding to those of graph c that occur at the midpoint of each cycle, these spikes being therefore separated from one another by an invariable interval $T_2$. The spikes f coincide with the positive half-cycles of square wave d and are therefore passed by AND gate P whenever that square wave is applied to the other input thereof. On start-up, however, the phase is indeterminate so that the wave u (bottom graph of FIG. 4) issuing from divider DV, after being delayed by $T_2/4$ in line CR, may correspond either to wave d or to its complement e. In the latter case the gate P will pass the spikes of graph m, FIG. 4, in lieu of those of graph f to phase detector RF and to the synchronizing input of oscillator PLL to which the output wave of delay line CR is fed back via its phase-locking loop; that wave also goes to phase detector RF which, in the presence of wave e, emits an error signal s to divider DV.

Figure 2:
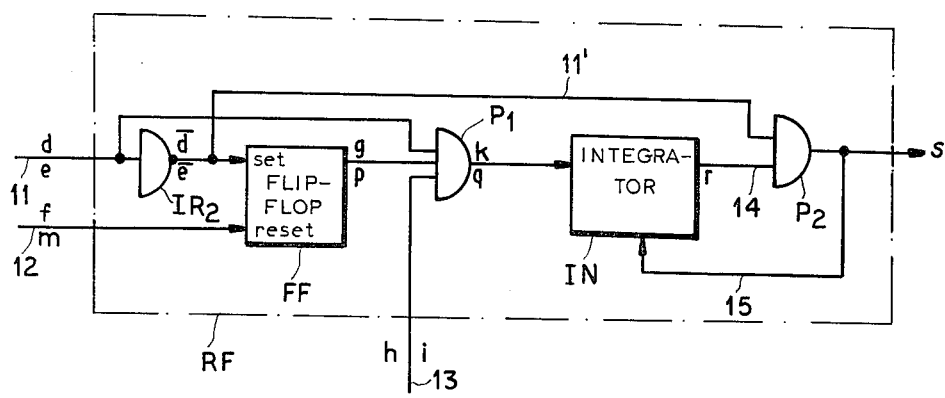
FIG. 2 is a more detailed diagram of a phase detector forming part of that circuitry.

In FIG. 2 I have shown details of the phase detector RF embodying the present improvement. This detector has input leads 11, 12 and 13, also shown in FIG. 1, respectively carrying the square wave d or e, the spikes f or m and the inverted square wave h or i. Lead 11 extends by way of an inverter $IR_2$ to a setting input of a flip-flop FF having a resetting input connected to lead 12. The set output of flip-flop FF works into an AND gate $P_1$ having two other inputs respectively connected to leads 11 and 13. This AND gate supplies an output signal k or q to an integrator IN with an output lead 14 which is connected, together with a branch lead 11' from the output of inverter $IR_2$, to another AND gate $P_2$ generating the error signal s.

The two mutually complementary square waves h and i, illustrated in corresponding graphs of FIG. 4, are delayed by a quarter-cycle with reference to square waves d and e mitted by the delay circuit CR of FIG. 1. Thus, no matter which of these square waves is present on lead 11, positive pulses on leads 11 and 13 will overlap for substantially 90° (i.e. for a period $T_1/2$) during each cycle $T_2$ of that square wave. Gate $P_1$ does not conduct as long as that period of overlap does not coincide with a positive pulse on the set output of flip-flop FF, carrying pulses g or p also illustrated in homonymous graphs of FIG. 4. When the signal present on lead 11 is the square wave d, flip-flop FF is set by the positive half-cycle of its complement $\bar{d}=e$ and is reset by a spike f at the instant when quadrature wave h on lead 13 goes positive. Under these circumstances, signal g on the set output of flip-flop FF goes to zero during the period of overlap of the two square waves whereby AND gate $P_1$ is cut off and emits a zero-level signal k to integrator IN. The output lead 14 of that integrator, therefore, remains de-energized and blocks the emission of an error pulse s by gate $P_2$.

If, on the other hand, the signal on lead 11 is the wave e, the corresponding spikes m on lead 12 occur only intermittently so that flip-flop FF is not invariably reset after having been set by the inverted wave $\bar{e}=d$. The output signal p of the flip-flop will therefore persist in some cycles for a full period $T_2$, causing the AND gate $P_1$ to conduct during the overlap of waves e and i. This results in the emission of coincidence pulses q which are accumulated by integrator IN until their sum reaches a certain threshold to energize the output lead 14 with a signal r unblocking the gate $P_2$. When this occurs, the next positive pulse of wave e on lead 11' passes the gate $P_2$ and gives rise to an error pulse s which shifts the output wave u of frequency divider DV by 180°. As a result of this shift, waves e and i on the leads 11 and 13 are replaced by their complements d and h while the periodically recurrent spikes f appear on lead 12 in lieu of the intermittent spikes m.

Integrator IN may be similar to the threshold circuit of the aforementioned Cottatellucci U.S. Pat. No. 4,232,387, including a resistance/capacitance network in cascade with a Zener diode whose breakdown produces the unblocking signal r. By varying the time constant of this R/C network, I can adjust the response time of the phase detector RF while taking into account its sensitivity to noise, allowing for a certain amount of phase jitter of the incoming carrier wave b and for the resulting phase shifts between the output wave u of divider DV and the spikes derived from that carrier by differentiator DR. A feedback connection 15 from the output of gate $P_2$ insures a prompt discharge of the capacitance of integrator IN after the emission of an error signal s, as likewise taught in the Cottatellucci patent.

The error signal s may be fed, as described in the commonly owned Caldarella et al patent, to a flip-flop constituting the final stage of divider CV for switching same out of turn.

I claim:

1. In a receiver for a biphase-coded carrier wave of predetermined frequency undergoing a phase reversal in the middle of each cycle thereof and also at the beginning of certain cycles according to the logical value of corresponding bits of a binary message conveyed thereby, in combination:
    input means connected to a transmission line over which said carrier wave arrives from a remote station;
    decoding means connected to said input means for sampling said carrier wave once per cycle to reconstruct said binary message; and
    circuitry for producing a sequence of timing pulses recurring at said predetermined frequency and controlling the sampling of said carrier wave in said decoding means, said circuitry comprising differentiation means connected to said input means for deriving a spike from said carrier wave upon each phase reversal thereof, timing means controlled by said differentiation means for producing a local square wave of said predetermined frequency in substantial quadrature with said carrier wave, gating means with inputs respectively connected to outputs of said differentiation means and of said timing means for blocking the transmission of said spikes during a fraction of each cycle of said carrier wave equal to substantially half a cycle thereof, and phase-detecting means with input connections to outputs of said gating means and of said timing means for emitting an error pulse in response to a discontinuity in the succession of spikes passed by said gating means, said phase-detecting means including a flip-flop settable by the complement of said square wave and resettable by unblocked spikes from said gating means whereby said flip-flop is in its reset state during one quarter of each cycle of said square wave upon periodic recurrence of said unblocked spikes, said phase-detecting means further including coincidence-gate means with inputs connected to an output of said flip-flop and to output leads of said timing means carrying said square wave and a replica thereof relatively offset by 90° causing conduction of said coincidence-gate means upon failure of said reset state to occur during a period of overlap of said square wave and said replica, said coincidence-gate means having an output circuit extending to said timing means for triggering same into a reversal of the phase of said square wave.

2. The combination defined in claim 1 wherein said output circuit includes integrating means for generating an error pulse, capable of triggering said timing means, only upon recurrent conduction of said coincidence-gate means in a succession of cycles of said square wave.

3. The combination defined in claim 2 wherein said output circuit further includes a gate downstream of said integrating means controlled by said square wave for limiting the duration of said error pulse to a half-cycle of said square wave.

* * * * *